United States Patent [19]

Carre et al.

[11] Patent Number: 4,571,942
[45] Date of Patent: Feb. 25, 1986

[54] SERVOMOTOR FOR ASSISTED BRAKING

[75] Inventors: Jean-Jacques Carre, Montreutl; Yves Meyer, Tauerny, both of France

[73] Assignee: Societe Anonyme D.B.A., Paris, France

[21] Appl. No.: 441,717

[22] Filed: Nov. 15, 1982

Related U.S. Application Data

[63] Continuation-in-part of Ser. No. 157,907, Jun. 9, 1980, abandoned.

[30] Foreign Application Priority Data

Jun. 15, 1979 [FR] France .............................. 79 15413

[51] Int. Cl.⁴ ............................................. B60T 13/00
[52] U.S. Cl. ...................................... 60/547.1; 92/169
[58] Field of Search ....................... 60/547.1, 552, 553, 60/554; 91/369 A, 376 R; 92/169, 169.2, 169.3, 169.4

[56] References Cited

U.S. PATENT DOCUMENTS

| 2,763,989 | 9/1956 | Ayers, Jr. | 60/553 |
| 3,016,880 | 1/1962 | Kellogg | 60/547.1 |
| 3,237,525 | 3/1966 | Stelzer | 60/547.1 |
| 3,628,422 | 12/1971 | Acre | 92/169.2 |
| 4,246,755 | 1/1981 | Weiler | 60/547.1 |
| 4,417,500 | 11/1983 | Hayashida | 92/169.4 |

FOREIGN PATENT DOCUMENTS

| 1230198 | 9/1960 | France . |
| 1527482 | 4/1968 | France . |
| 2076172 | 10/1971 | France . |
| 2225319 | 11/1974 | France . |
| 2283804 | 9/1975 | France . |
| 2004609 | 9/1978 | United Kingdom . |

OTHER PUBLICATIONS

Advanced Mechanics of Materials, Sealy and Smith, 2nd Ed. 1952, John Wiley & Sons, pp. 48–59.

Primary Examiner—Abraham Hershkovitz
Attorney, Agent, or Firm—Leo H. McCormick, Jr.; Ken C. Decker

[57] ABSTRACT

The servomotor, of the vacuum type, comprises a housing composed of two shells, each comprising a peripheral sleeve and a side end wall. The shells include a connecting web between the sleeve and the side wall, parabolic in profile, due to which the resultant of shearing and traction stresses is minimal, which allows the thickness of the shell material to be significantly reduced. Applications are braking systems with vacuum servomotor for motor vehicles.

13 Claims, 3 Drawing Figures

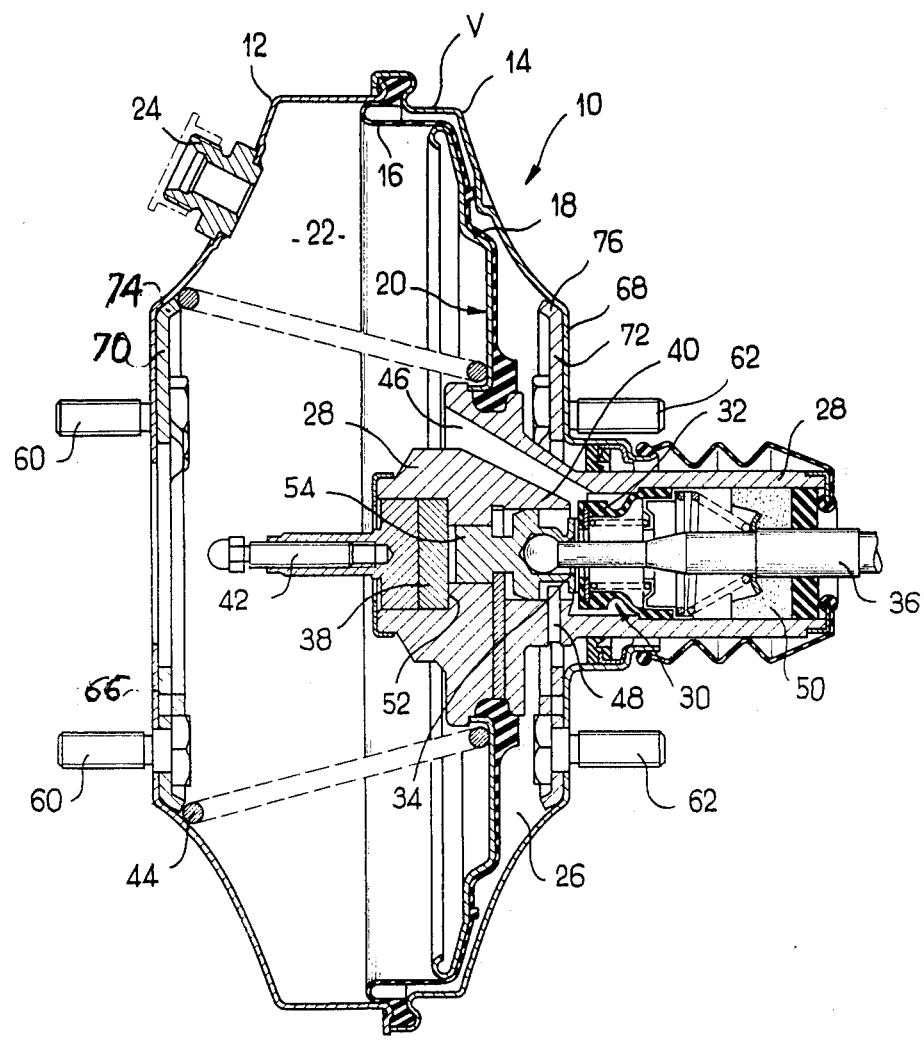
FIG_1

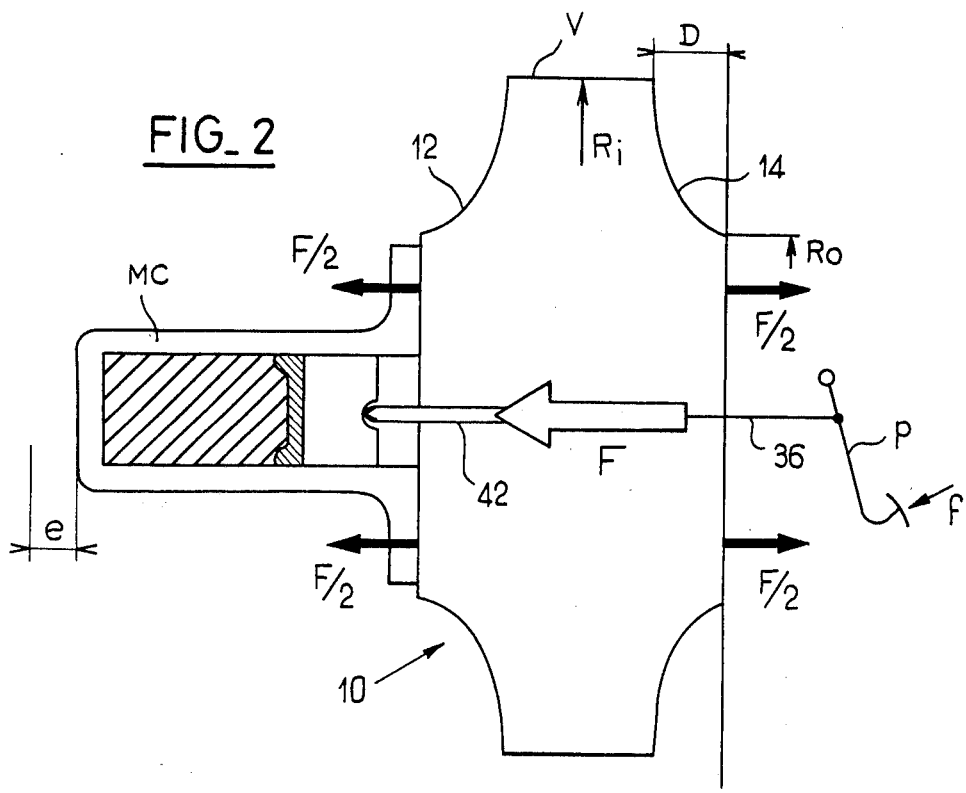
FIG_2
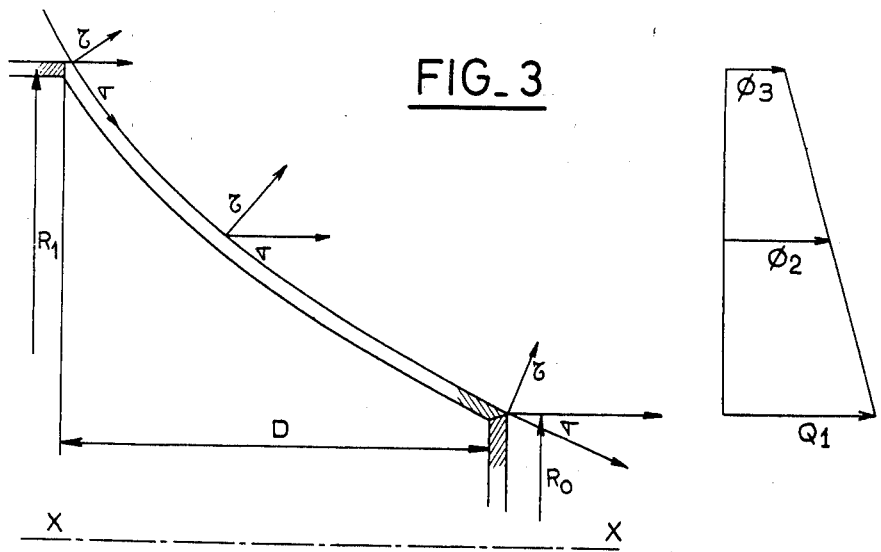
FIG_3

SERVOMOTOR FOR ASSISTED BRAKING

This application is a continuation-in-part of application Ser. No. 157,907 filed June 9, 1980, now abandoned.

The object of the present invention is an improvement to servomotors of the vacuum type for assisted braking.

Servomotors of the vacuum type are known. Such servomotors have a housing in which a drive-piston which separates a low pressure chamber, permanently communicating with a vacuum source, from a high pressure chamber, operately coupled to the atmosphere. The drive-piston is capable of travelling from a rest position in response to the establishing of a difference in pressure between the two chambers. The difference in pressure is controlled by a valve connected to an input control member.

In existing servomotors of the vacuum type, the amount of stress exerted on the housing is such that it is necessary to use very thick sheet metal which results in a very heavy servomotor. The object of the invention is to reduce the weight of such servomotors while maintaining their qualities of good mechanical resistance.

To this end, the invention proposes a servomotor of the vacuum type for assisted braking. The servomotor is located between a fixed partition in the vehicle and a master-cylinder. The servomotor has a housing in which a drive-piston divides a chamber coupled to the atmosphere from a chamber coupled to a source of vacuum. A valve connected to a brake pedal controls movement of the said drive-piston, which is directly connected to the master-cylinder. A reaction means provides feedback from the master cylinder to a control rod connected to the brake pedal. The housing is made of two shells. Each shell has at its periphery a sleeve sealingly connecting it to the other and a central end wall, which is substantially annular and coaxial with the said sleeve. The end wall of one of the shells is connected to the master-cylinder and the end wall of the other shell is connected to the fixed partition. At least one of the said sleeves is connected at the outermost edge of the corresponding annular wall by a thin web, produced integrally with the sleeve and/or the annular wall. The provile of the thin web in section is a radial plane whose shape is substantially a segment of a parabola. The concavity of the thin web is outwards so the the resultant of shearing and traction stresses is minimal for all the elementary sections that make up the web.

In summary this invention relates to a servomotor which is located between a stationary wall and a master cylinder in a brake system of a vehicle. The servomotor has a housing the interior of which is divided or separated into first and second pressure chambers by a drive piston. A valve member responsive to a brake signal selectively controls fluid displacement between the first and a second chambers to create a pressure differential across the drive piston. The housing is made of two shells each of which has a substantially axial sleeve portion and an annular central end wall joined by a connecting web. The connecting web has a progressive evolutive profile that extends in a radial plane from the central end wall to the axial sleeve. A reinforcing member located against and having substantially the same dimensions of the end wall has a peripheral surface that engages a portion of the thin web to provide support for the connecting web. Members extending from the reinforcing member extend through the end wall to secure the shell to either the stationary wall or master cylinder. With the evolutive profile extending from the end wall, axial deformation of the servomotor is substantially reduced and all of the brake signals are applied to operate the valve member.

The invention will be better understood by reading the following description which refers to the attached drawings in which:

FIG. 1 is a view in longitudinal section of a servomotor according to a preferred embodiment of the invention;

FIG. 2 shows diagrammatically the stresses applied to the housing of a servomotor in the case of failure of the braking assistance; and FIG. 3 shows diagrammatically the distribution of stresses in the profile in a radial plane of one of the shells of the servomotor in FIGS. 1 and 2.

The assistance servomotor illustrated in FIG. 1 is of the vacuum pneumatic type. It comprises a housing 10 formed of two shells 12 and 14. The shells 12 and 14 which are solid at their periphery grip the periphery of a flexible membrane 16. Membrane 16 and a rigid plate 18 form a drive piston 20. The drive piston divides the housing into a low pressure chamber 22, permanently communicating with a vacuum source via a non-return valve 24, and a high pressure chamber 26. The plate 18 includes a hub 28 which projects out from the housing. A control valve 30 of the three-way type is disposed in this hub 28. The control valve 30 has an annular valve memeber 32 capable of coming to rest alternately on a seat 34 connected to an input control member 36 and seat 40 fixed with respect to the drive-piston. An action disc 38 retained in hub 28 is in contact with one end of a push rod 42. Push rod 42 is capable of operating an external control (not represented) such as, for example, a master cylinder for braking a motor vehicle. A spring 44 supported by the housing urges the drive-piston 20 into its rest position where it bears on the shell 14. When the servomotor is in its rest position as represented, the valve member 32 is disengaged from the seating 40 so as to allow chambers 22 and 26 to communicate via passages such as 46 and 48 through the hub 28. Conversely, when the valve member 32 is resting on seat 34 communication between the atmosphere and the high pressure chamber 26 is interrupted.

The vacuum servomotor, as just described, is conventional in type and works as follows:

When the driver of the vehicle pushes the brake pedal, input control member 36 initially moves to the left of FIG. 1 to allow the annular valve member 32 to rest on the seat 40 and interrupt communication between the low pressure chamber 22 and the high pressure chamber 26. Further movement of the input control member 36 to the left disengages valve member 32 from the seat 34 and allows air from the atmosphere to pass into the high pressure chamber 26 by flowing through a filter 50, the central part of the valve member 32 and passage 48. As a result, a difference in pressure is created between the two chambers. This difference in pressure urges the drive-piston 20 towards the left of FIG. 1 and because of the presence of the shoulder 52 in the hub 28 acts through reaction disc 38 to move output rod 42 also towards the left of FIG. 1. The resistance to movement of the output rod 42 is transmitted to the input rod via the disc 38 acting on a solid extension 54 of the valve member 34. It will be noted that the control valve 30 is of the follower type, that is to say, the displacements of various movable members of the control valve are effected with respect to the drive-piston 20.

In the case of failure of the servomotor, due, for example, to an absence of vacuum, the driver of the vehicle is able to continue to control the master-cylinder if a very great effort is exerted on the pedal. The driver presses the input control member 36 and urges the extension 54 against the reaction disc 38 to transmit the braking effort to the push rod 42 that operates the master-cylinder (not represented).

The various forces to which the servomotor housing is subjected on (non-assisted) actuating of the brakes of the vehicle in such conditions has been shown in FIG. 2.

For an effort "f" exerted on the pedal "p", the input control member 36 transmits to the push rod 42 a force "F" equal to the effort "f" multiplied by the pedal ratio.

The force "F" tends to separate the master-cylinder "MC" from the shell 12. This force "F" exerts a traction "F/2" on each of two fixing screws 60. The reaction forces (F/2) are applied to the partition "P" of the vehicle on which the servomotor/master cylinder unit is fixed by the two fixing screws 62 have also been shown in FIG. 2.

Functioning in such conditions subjects the housing to very considerable stresses which result in the shells 12 and 14 separating and the master-cylinder "MC" moving forward by a corresponding amount "e" (towards the left in FIG. 2).

One of the tests to which servomotors of the type described are subjected requires that the distance "e" remain less than 1.5 mm for an effort on the pedal "p" of 200 daN which corresponds to a force "F" equal to 1 000 daN. To fulfill such a condition, it has been necessary to make housings relatively thick and consequently very heavy.

The invention aims at designing a housing which is as light as possible for a deformation "e" still within the imposed limits.

The characteristics of the servomotor (drive-piston section) together set the radius "R" of the external sleeve "V" of each shell 12 or 14, the radius "$R_0$" of the side wall to be fixed to the master-cylinder or to the partition "P" as well as the distance "D" measured parallel to the axis of the servomotor between the side wall and the junction with the sleeve "V".

Another condition required of the manufacturer of servomotors is the use of thin stamped sheet metal.

In a housing where the sleeve is directly connected to the edge of the side end wall (that is to say, $R_1=R_0$) the sleeve is subjected to purely traction stresses whereas the side wall is subjected mainly to shearing stresses; as a result, sheet metal is used which is sufficiently thick for the construction of the side wall but too thick for the sleeve.

In the case of a housing with substantially the general geometric forms of the drawing of FIG. 1, a connection between the wall 66 (or 68) and the sleeve "V" via a truncated cone necessitates the use of a relatively thick sheet metal because it has to resist combined stresses, in which shearing stresses predominate.

According to the invention, a connection surface is used in which the shearing and traction stresses are suitably distributed so that at any point of the housing the resultant stress, called "equivalent", which is the combination of stresses at this point is less than the stress at the elastic limit for simple traction of the metal sheet.

This good distribution is obtained with a profile which, taken in a radial plane of intersection of one shell, is substantially a segment of a parabola whose concavity is directed outwardly of the shell. Such a profile has been obtained empirically by permanent deformation of a thin metal sheet with low elastic limit.

With this "iso-stress" profile, it is possible to work the metal of the housing in accordance with the established formula of the maximum shearing theory $$\sqrt{\delta^2+4\tau^2}=\text{Constant}$$

$\delta$ being the stress at the elastic limit for pure traction and $\tau$ being the stress at the elastic limit for pure shearing.

For forces $\emptyset_1$, $\emptyset_2$, and $\emptyset_3$ (which decrease linearly for increasing radii) the combinations obtained for $\tau$ and $\delta$ thanks to the "iso-stress" profile have been shown diagrammatically in FIG. 3.

The two shells 12–14 are made by stamping of a thin metal sheet of constant thickness, their bottom or end wall 66–68 extending in a transverse plane is subjected to shearing stresses which are taken by reinforcing rings 70–72. The outer edge 74–76 of each of the rings 70–72 is folded back so as to cooperate with the connection web of "iso-stress" profile. This cooperation must be perfect if deterioration of the shells in this location is to be avoided. The reinforcing rings 70–72 are preferably made of aluminum. Their folded-back edge also helps to give them a good mechanical resistance. They are solid with the fixing screws for connection with the master cylinder 60 or with the fixed partition 62 respectively.

It will be noted that the annular end walls 66 and 68 and the reinforcements 70 and 72 are not necessarily defined by the inner and outer circles coaxial with the sleeve "V". The circular configuration is advantageous when four fixing screws 60 and 62 are used, however, in certain applications a lozenge, square, rectangular, or other shape may be more useful. In this last case, the connecting web will be constituted by a family of parabolic profiles in which the law of iso-stress will be observed.

With the improvement just described, it is possible to make the housing of a servomotor from sheet mild steel 0.5 mm thick whereas hitherto a sheet 1.5 mm thick was used to obtain comparable resistance. The reduction in weight resulting is of the order of 50%.

We claim:

1. A servomotor to be operationally located between a stationary wall in a vehicle and a master cylinder of a brake system of said vehicle, said servomotor having a housing, a drive piston that separates a first pressure chamber from a second pressure chamber in said housing, and a valve member for selectively controlling fluid displacement between said chambers in response to a brake signal to create a pressure differential across said drive piston, said housing being made of two shells mutually assembled peripherally, each of said shells including a peripheral substantially axial sleeve portion and an annular central end wall which is coaxial to said sleeve portion, said sleeve portion of at least one of said shells being axially off-set from the corresponding said annular central end wall and connected thereto by a connecting thin web integral with said annular central end wall and having, in a radial plane, a progressively evolutive profile, and fixing means for connection respectively to said stationary wall and to said master cylinder, wherein said at least one shell further includes a reinforcing annular member located against and having substantially the same radial extension as said annular central end wall and force transmittingly linked to the corresponding said fixing means, said reinforcing annular member having a peripheral edge portion shaped to matingly cooperate in bearing engagement with the adjacent portion of the smaller diameter of said connecting thin web.

2. A servomotor according to claim 1, wherein said reinforcing annular member is fixedly connected to the corresponding said fixing means.

3. A servomotor according to claim 2, wherein said reinforcing annular member has a peripheral edge folded back inwardly.

4. A servomotor according to claim 2, wherein each said shell includes said reinforcing annular member with fixing means for fixing respectively to said stationary wall and to said master cylinder.

5. A servomotor to be operationally located between a stationary wall in a vehicle and a master cylinder of a brake system of said vehicle, said servomotor having a housing, a drive piston that separates a first pressure chamber from a second pressure chamber in said housing, and a valve member for selectively controlling fluid displacement between said chambers in response to a brake signal to create a pressure differential across said drive piston, said drive piston being moved by said pressure differential to develop an operational force in said master cylinder, said operational force producing reaction forces that are transferred through said housing to said stationary wall, said housing being made of two shells mutually assembled peripherally, each of said shells including a peripheral substantially axial sleeve portion and an annular central end wall which is coaxial to said sleeve portion, said sleeve portion of at least one of said shells being axially off-set from the corresponding said annular central end wall and connected thereto by a connecting thin web integral with said annular central end wall and having, in a radial plane, a progressively evolutive profile, and fixing means for connecting said housing to said stationary wall and to said master cylinder, wherein said at least one shell further includes a reinforcing annular member located against and having substantially the same radial extension as said annular central end wall and force transmittingly linked to the corresponding said fixing means, said reinforcing annular member having a peripheral edge portion shaped to matingly cooperate in bearing engagement with the adjacent portion of the smaller diameter of said connecting thin web to transfer said reaction forces to said thin web, said evolutive profile uniformly distributing said reaction forces throughout said thin web to reduce axial deformation of said housing.

6. A servomotor according to claim 5, wherein said reinforcing annular member is made of a light-alloy material.

7. A servomotor according to claim 5, wherein said reinforcing annular member is fixedly connected to the corresponsing said fixing means.

8. A servomotor according to claim 7, wherein said reinforcing annular member has a peripheral edge folded back inwardly.

9. A servomotor according to claim 7, wherein said reinforcing annular member is made of a light-alloy material.

10. A servomotor according to claim 7, wherein each of said shells includes said reinforcing annular member with said fixing means for fixing respectively to said stationary wall and to said master cylinder.

11. A servomotor located between a fixed partition in a vehicle and a master cylinder of a brake system, said servomotor having a housing with a drive piston that separates a first chamber from a second chamber, said first chamber being connected to a source of vacuum, a valve located in the drive piston through which said first chamber is connected to said second chamber to vacuum suspend the drive piston, said drive piston being connected to a brake pedal through a reaction member located between an output member connected to said master cylinder and a push rod connected to the brake pedal, said brake pedal responding to an input force by moving said valve to interrupt communication of vacuum to said second chamber and initiiate communication of air from the atmosphere to said second chamber to create a pressure differential across said drive piston, said pressure differential acting on said drive piston to provide said output member with an output force corresponding to said input force to provide an assist in effecting a brake application, said housing being made of two shells each of which includes a sleeve at its periphery and an annular central end wall coaxial to said sleeve, said shells resisting axial deformation thereof in response to transmission of said output force to said shells, the sleeve of one shell and the sleeve of the other shell being sealingly connected to each other, and means for connecting one shell end wall to said master cylinder and the other shell end wall to said fixed partition, characterized in that at least one of said sleeves is connected to the outermost edge of its corresponding annular end wall by a thin web of substantially constant thickness material to reduce the weight of the servomotor, said thin web having a sectional profile in a radial plane in the form of a segment of a parabola presenting its concavity outwards from said corresponding annular end wall toward said sleeve so that the combined shearing stress $\tau$ and tractional stresses $\delta$ for all the elementary sections of said thin web are related by the formula:

$$\sqrt{\delta^2 + 4\tau^2} = \text{constant}$$

whereby said thin web parabola segment resists the axial deformation of said shells for maintaining the axial deformation of the servomotor within set limits when an input force is applied to the brake pedal.

12. Servomotor according to claim 11, characterized in that the shells are reinforced by application against the annular wall of elements in the form of rings substantially of the same dimensions disposed inside the said shells and having an external edge folded back inwards which cooperates with the edge of smaller radial dimensions of the said thin web.

13. The servomotor according to claim 11 wherein said shells are reinforced by a plate having an external edge with substantially the same parabolic shape as the thin webs.

* * * * *